Sept. 26, 1967

H. C. HOUSE 3,343,649

CONVEYOR APPARATUS

Filed Dec. 27, 1965

INVENTOR
H. C. HOUSE
BY
*Young and Quigg*
ATTORNEYS

United States Patent Office 3,343,649
Patented Sept. 26, 1967

3,343,649
CONVEYOR APPARATUS
Harry C. House, Cincinnati, Ohio, assignor to Phillips
Petroleum Company, a corporation of Delaware
Filed Dec. 27, 1965, Ser. No. 516,645
8 Claims. (Cl. 198—46)

This invention relates to conveyors. In one aspect, this invention relates to apparatus for collecting and transmitting articles from a plurality of different locations to a single location. In another aspect, this invention relates to apparatus for controlling the travel of a conveyor.

It is often desirable to collect a predetermined number of different articles from a number of separate locations and transfer them to a single location where they can be used or packaged into a single container. The time required to undertake such a task on a commercial scale has necessitated the development of a variety of complex machines which function to collect, sort, and transfer different articles to a common point. A problem of major concern associated with many of these machines is that they are so complex and cumbersome in operation they cannot be employed other than for collecting and transmitting articles on unusually large-scale operations. Of course, the use of manual labor to collect and transfer different articles from different locations to a common location is much too tedious and slow to make the operation competitive in today's automated industry.

According to this invention, these and other disadvantages of the prior art conveying machines are overcome by means of apparatus which is inexpensive to construct and operate, simple in construction, and yet finds utility with practically any size commercial operation. The apparatus of this invention functions to transmit articles which can be the same or different from a plurality of separate locations to a single location such that they can be packaged or otherwise sealed by conventional wrapping machines. The apparatus comprises a conveyor means including a plurality of buckets mounted for travel over a path adjacent a plurality of separate locations having the articles, hopper means associated with each of the separate locations and the conveyor means for receiving articles from each of these locations, a control means connected to the conveyor means for effecting intermittent movement of the conveyor means to successively stop the buckets in a position to receive articles from the hopper means, and means connected to the hopper means for allowing articles to be transferred from the hopper means to the buckets of the conveyor means when the buckets are stopped. Suitable timer means can be employed for controlling the time the buckets remain stopped. Other features of the apparatus including optional modifications will be apparent and more fully explained in the detailed description.

The apparatus of this invention can be used to collect and transmit articles in an infinite number of situations for a variety of different purposes. In the packaging industry, for example, small articles such as nuts, bolts, screws, and the like can be collected in predetermined numbers and transferred to a single location where a packaging machine will wrap the articles in a single container. Containers having articles of this type in predetermined numbers are usually packaged with unassembled furniture kits, hobby kits, and the like. The apparatus of this invention is particularly suited for transmitting different electrical components such as the repair elements necessary for rebuilding or assembling radio kits, automobile distributor kits, electrical appliances, and the like.

Accordingly, it is an object of this invention to provide an apparatus for collecting and transmitting articles from a plurality of separate locations to a single location.

Another object of this invention is to provide a control means for regulating an apparatus to collect articles from a variety of different locations and to transfer them to a single location.

A further object of this invention is to provide an apparatus for supplying a packaging machine with a predetermined number of different articles collected from a number of different locations.

These and other objects of the invention will become apparent to one skilled in the art after studying the following detailed description, the appended claims, and the accompanying drawings wherein:

Referring now to the drawings, wherein like reference numerals are used to denote like elements, and particularly to FIGURE 1, the invention will be described in more detail. Many of the minute details of the invention have been omitted from the drawings for the sake of clarity.

Figure 1:
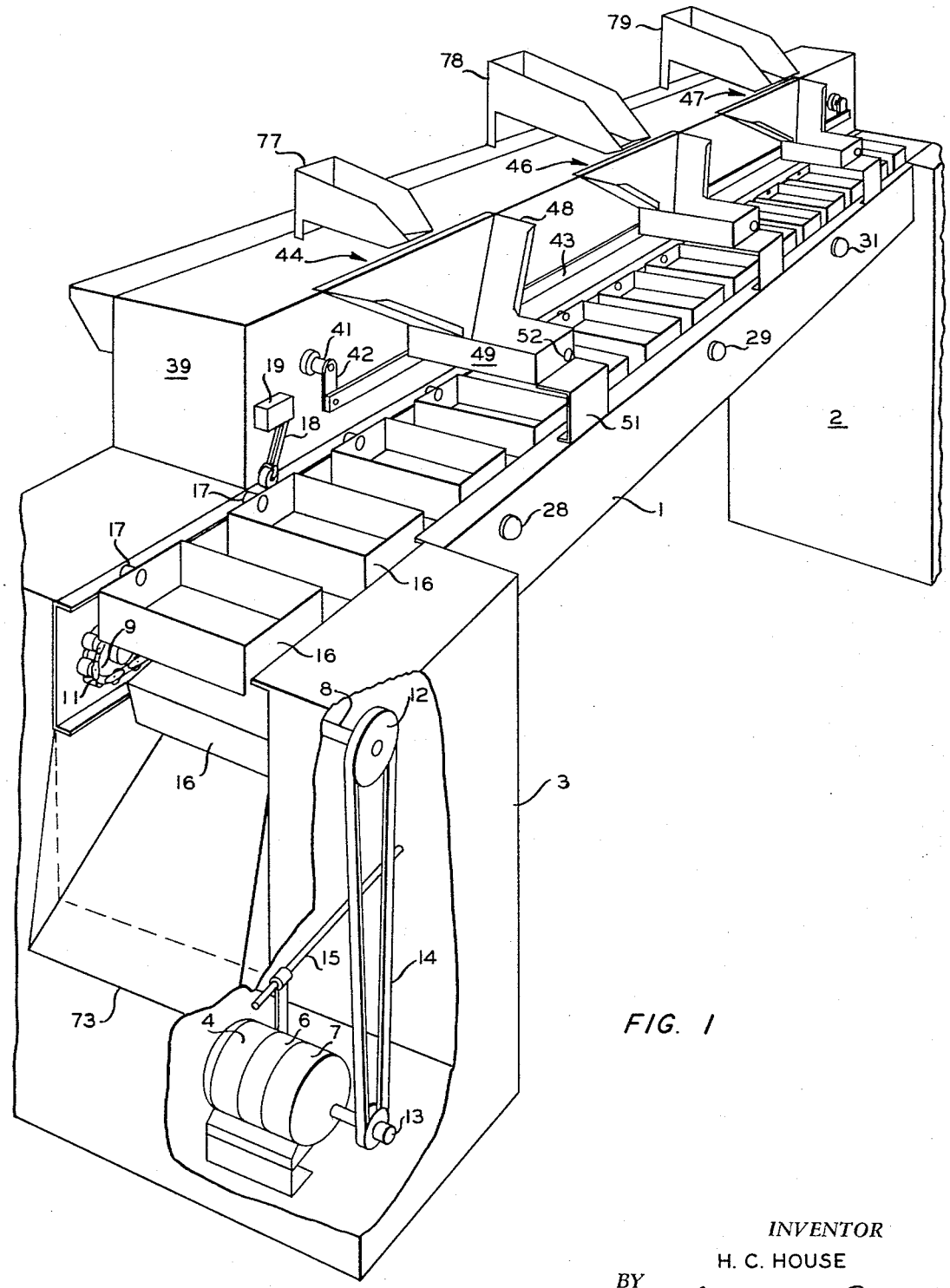
FIGURE 1 is a partially broken perspective view of an apparatus depicting the present invention.

The apparatus comprises a frame 1 supported at its ends by support members 2 and 3. Part of the conveyor means including an electric motor 4, brake means 6, and clutch means 7 are housed within support member 3 as indicated by the broken portion of FIGURE 1. Transverse shafts 8 are journaled in frame 1 and carry sprocket wheels 9, only one of the shafts and sprockets being shown. A pair of link roller chains 11, one of which is shown, passes over the sprocket wheels 9. A V-pulley 12 attached to the free end of shaft 8 will transmit rotational motion to chains 11 from motor 4 through the medium of a variable drive V-pulley 13 and belt 14. The variable pulley 13 can be adjusted by an adjustment means 15. A plurality of buckets 16 is secured to the conveyor chains 11 in a manner which will allow them to be carried by the chains 11 as they follow their endless path in response to the rotation of sprockets 9. The buckets can be attached by rivets, spot welding, or bolts. Each of the buckets 16 is provided with a protruding rod 17 at its end to engage arm 18 of a first switch means 19 adapted to control movement of the chains 11 and buckets 16.

Figure 4:
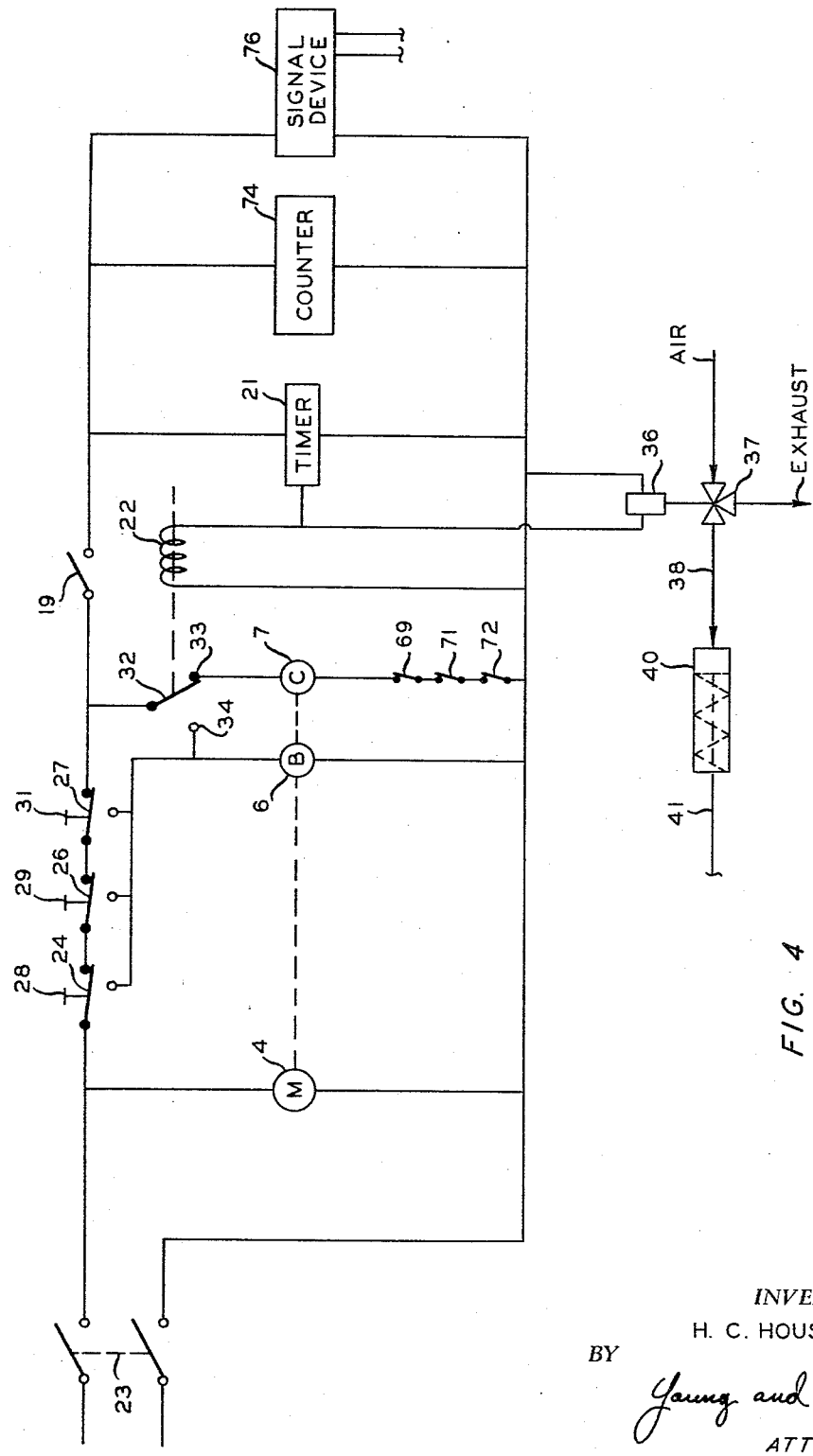
FIGURE 4 is a schematic diagram illustrating the control means and the means for allowing the articles to be transferred from the hopper means to the buckets of the conveyor means.

Referring to FIGURE 4 of the drawings, the first switch means 19 is positioned in the control means to pass current to an adjustable timer 21 and a relay 22 when main switch 23 and safety switches 24, 26, and 27, are closed. Safety switches 24, 26, and 27 are provided with buttons 28, 29, and 31, respectively, which protrude from frame 1 to allow the current flow to be interrupted and the travel of buckets terminated as will be more fully hereinafter explained. A single-pole, double-throw switch 32 is mechanically connected to relay 22 to move from contact point 33 to contact point 34 in response to current flow through relay 22. As indicated by FIGURE 4, when switch 19 is opened and there is no current flow to timer 21 and relay 22, the switch 32 is in engagement with contact point 33. When switch 32 is in engagement with contact point 33, current will pass to clutch means 7 operatively connecting motor 4 and the variable speed pulley means 13 for the purpose of transmitting rotational motion from the motor to the pulley 12. When switch 32 engages contact point 34, in response to current flow through relay 22, current flow to clutch means 7 will stop and will pass instead to the brake means 6 thereby stopping the motion of pulley 13, pulley 12 and of the chains 11 and buckets 16.

When current is passing to timer 21 and relay 22, it also passes to and energizes a solenoid means 36 mechanically connected to a three-way valve 37 for supplying air under pressure through line 38 to an air cylinder 40. The air cylinder 40 is provided with an interiorly disposed spring which will return the piston of the cylinder when the air pressure is released through the exhaust line upon de-energizing solenoid 36. The working end of the air cylinder 40 is operatively connected to a crank (not shown) positioned within housing 39 and attached to shaft 41. Movement of the working end of the air cylinder 40 will cause shaft 41 to rotate thereby imparting motion to crank 42 and bar 43.

Figure 2:
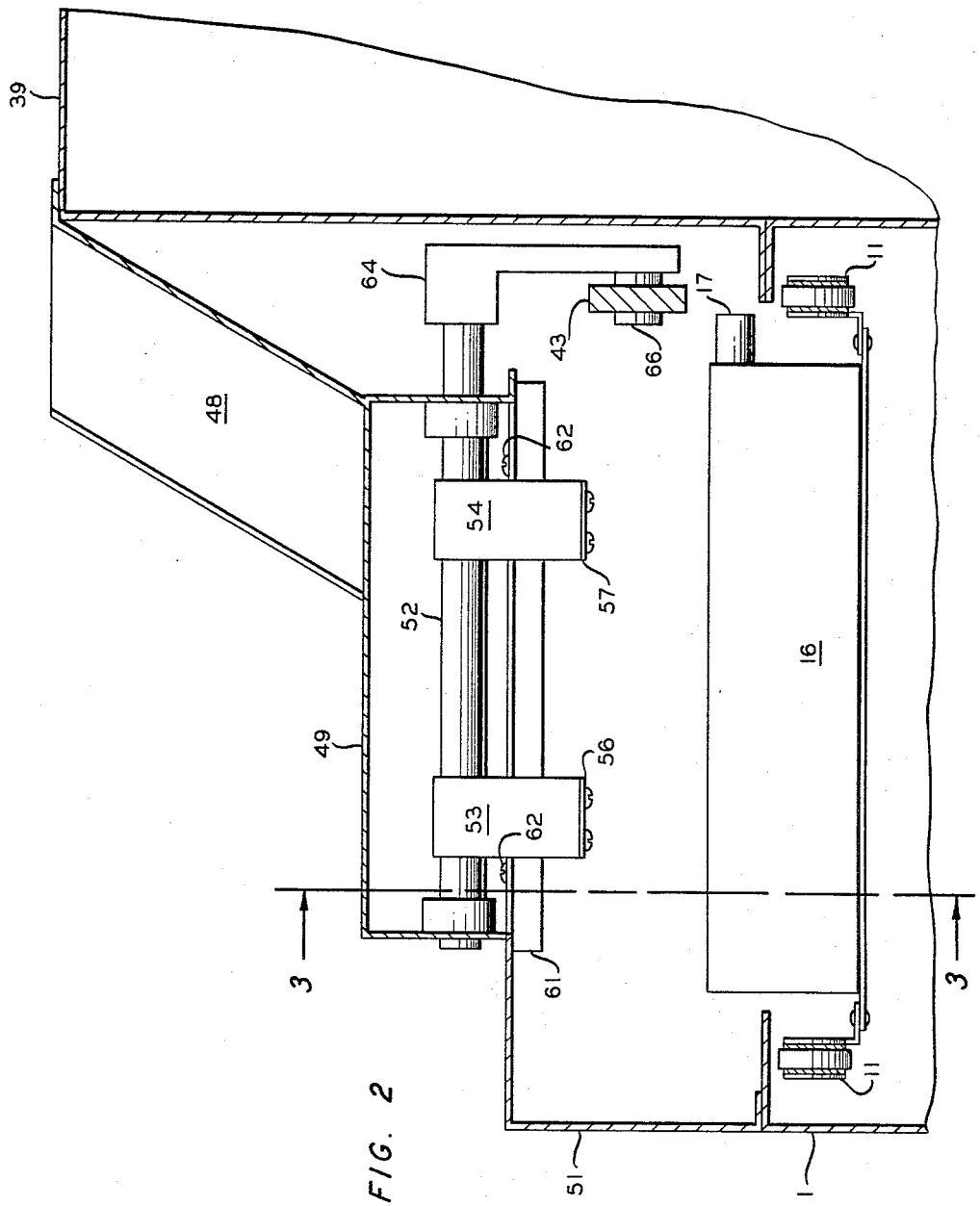
FIGURE 2 is a cross section transverse of the apparatus illustrating a portion of the hopper means and the buckets of the conveyor means.
Figure 3:
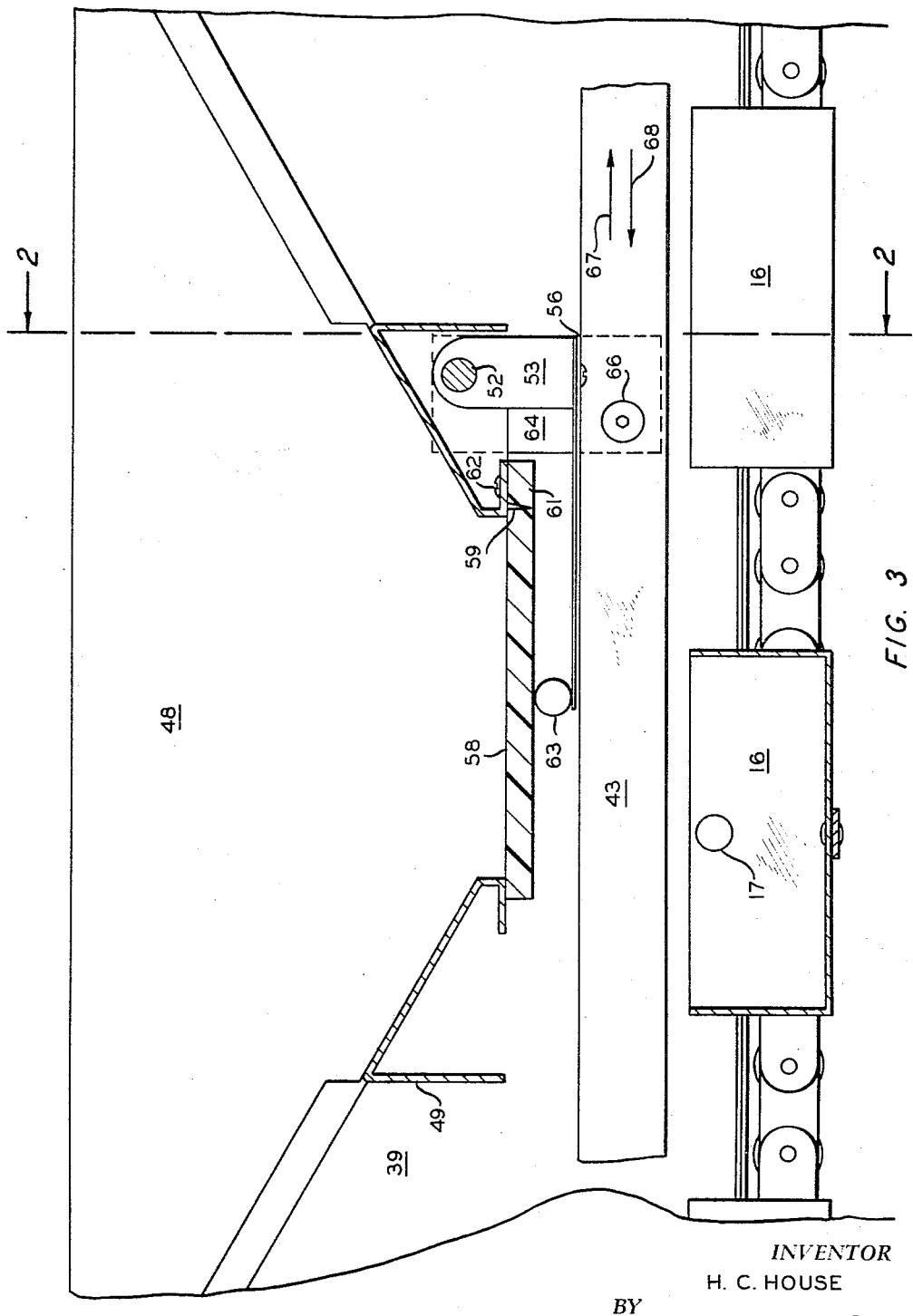
FIGURE 3 is a cross section along the line 3—3 of FIGURE 2.

The hopper means of the invention includes a plurality of units shown generally in FIGURE 1 by reference numerals 44, 46, and 47. Referring to FIGURES 2 and 3 of the drawings, the hopper means is illustrated in more detail. Each of the hopper means includes a chute 48 directed upwardly from the end of a box 49. The end of the box 49 opposite the end with the chute 48 is supported on frame 1 by support member 51. A shaft 52 journaled in the ends of box 49 carries a pair of depending blocks 53 and 54. A pair of leaf springs 56 and 57 is attached to blocks 53 and 54, respectively, by a plurality of screws as shown. The bottom of box 49 includes a trap door 58 having a self hinge including a groove 59 extending across the trap door 58 between the ends of the box 49 and through a substantial portion of the thickness of the trap door 58. A strip 61 along the edge of the trap door is securely attached to the undersurface of the box 49 by screws 62. The trap door 58 is constructed of a plastic material such as polypropylene or the like. Any material which will accommodate a self hinge in the manner shown can be used. A pair of short rod members 63 of a length substantially equal to the width of leaf springs 56 and 57 are positioned between the springs 56 and 57 and the bottom surface of the trap door 58. Rods 63 can be attached to the leaf springs as by welding or the like in a manner which allows the springs to maintain the trap door 58 in positive contact with the bottom surface of hopper 49.

The free end of shaft 52 is provided with a crank 64 having an opening near its bottom end to accommodate pin 66 for attaching the crank 64 to bar 43. Suitable sleeve bearings and washers can be used to align and connect the bar 43 to the crank 64. As the bar 43 moves in the direction indicated by arrow 67 in FIGURE 3 of the drawings, in response to a change in position of the air cylinders 40 which will rotate shaft 41 and move crank 42, the lower end of crank 64 is moved such that leaf springs 56 and 57 and crank 64 rotate about pin 52. This will allow the trap door 58 to move to its open position due to its own weight and the weight of any articles which may be resting on it.

When the bar 43 moves in the direction indicated by arrow 68 in FIGURE 3 of the drawings, in response to opposite movement of the air cylinder 40, shaft 41, and crank 42 (FIGURE 1), the leaf springs 56 and 57 and crank 64 are rotated back to their original position about shaft 52. The force of the leaf springs 56 and 57 transmitted to the undersurface of the trap door 58 by means of rods 63 holds the trap door 58 in engagement with the bottom surface of box 49.

Each of the trap doors 58 in the hopper means 44, 46, and 47 is provided with one safety switch 69, 71, or 72 in the electric line connecting the clutch means 7 to the control means. Safety switches 69, 71, and 72 are designed to close when the trap door 58 has been moved to its closed position in contact with the bottom surface of box 49. This will allow the clutch means 7 to impart motion to the buckets 16 to move them to their next position. In the event the trap doors 58 cannot return to their closed position, the safety switch will not close and the clutch means cannot impart motion to the buckets 16. This safety feature prevents the apparatus from becoming damaged in the event the trap door 58 remains partially open.

A chute 73 formed in the end of support member 3 will direct the contents dumped from buckets 16 as they pass over sprockets 9 to a common location. If desired, the chute 73 can be conveniently employed for directing the contents from buckets 16 into a packaging machine such as the Model MA–12 plastic packaging machine manufactured and sold by the Mehl Manufacturing Company, Cincinnati, Ohio.

The adjustable timer 21 can be any device which functions to pass current to relay 22 for a predetermined period of time in response to the closing of switch 19. A timer which is particularly suited for this purpose is the Cramer Type TEC time delay relay Style A manufactured by the R. W. Cramer Company, Inc., Centerbrook, Conn.

The motor 4 and the brake and clutch means 6 and 7 of the control means can be assembled from a variety of different models and types of components. A motor which can be used is the General Electric Model No. 5KC 42JG19X. A brake and clutch assembly which can be used in conjunction with this motor is the Warner Electric Company brake-clutch Model EM 50–12.

An electric counter 74 attached to the control means will indicate the number of stops for the buckets 16 by recording the number of times switch 19 moves to its closed position. This provides an indication of the number of sets or groups of articles assembled and passed from separate locations to a single location. A suitable counter which can be used for this purpose is a Prefix "CE4" Instrument Counter Type CE40BS402 available from Allied Radio, 100 N. Western Ave., Chicago, Ill.

A signal device 76 is attached to the control means for the purpose of establishing a signal in response to each stop of the conveyor. This signal can be passed to a packaging machine such as the MA–12 manufactured by Mehl Manufacturing Company for the purpose of activating it to wrap and seal the articles collected in buckets 16 and dumped into chute 73. A suitable signal device which can be used for this purpose is a Series 90 Model 90–65 Time-Delay Timer available from the Industrial Timer Corporation, 1407 McCarter Highway, Newark, New Jersey.

In the operation of the apparatus of this invention a plurality of removable product bins 77, 78, and 79 is provided with a multitude of different articles which are to be transferred to a single location. The product bins are positioned upon housing 39 in separate locations adjacent each of the hopper means 44, 46, and 47. A predetermined number of each of the articles in the product bins can be tipped in by hand or otherwise transferred from the bins to the hopper means by the personnel operating the apparatus. Only one product bin is shown adjacent each hopper; however, more than one may be adjacent each hopper.

Main switch 23 is closed to start motor means 4 and each of the hopper means is charged with the desired number of articles. Safety switches 28, 29, and 31 remain closed to allow current to flow through switch 32 to clutch means 7. The safety switches 69, 71, and 72 are likewise in their closed positions when the trap doors 58 are all closed. At this time switch means 19 is in its open position. This will case the clutch means 7 to transmit the rotational motion of motor means 4 to the variable speed pulley 13 with the result that shaft 8, sprocket 9, chains 11, and buckets 16 are advanced. The movement of the buckets 16 continues until the rod 17 of the bucket traveling in the direction of switch 19 contacts the roller on arm 18 to cause switch 19 to close. This allows current to be transmitted to the timer means 21 which immediately transmits the current to relay 22. The current flow through relay 22 moves switch 32 from contact point 33 to contact point 34 with the result that the clutch means 7 becomes disengaged and no longer transmits motion from the motor 4 to the variable speed pulley 13. The current flow to the brake means 6 causes it to immediately stop the conveyor. The switch 19 and contact arm 18 are positioned and adjusted relative to the line or procession of buckets 16 and rods 17 so that in the continuous operation of the apparatus each of the buckets will at some time be moved into position beneath each of the hopper means so that the articles can be transferred from each of the hopper means to each of the buckets.

The electric current transmitted through the adjustable timer 21 passes to the solenoid 36 to move the three-way valve 37 to allow air under pressure to be admitted to air cylinder 40 to move shaft 41, crank 42, bar 43, crank 64, shaft 52, blocks 53 and 54, and trap door 58 to allow the articles collected in the hoppers to be transferred from the hopper means to the buckets 16.

The dwell time of the buckets beneath each of the hopper means 44, 46, and 47 can be controlled by adjusting the timer 21 to stop the flow of current to relay 22 and to solenoid 36 at the end of a predetermined period of time. As solenoid 36 is de-energized the three-way valve 37 moves to its closed position and causes air to exhaust from the air cylinder 40 so that the spring in the air cylinder will cause it to move shaft 41, crank 42, bar 43, crank 64, shaft 52, blocks 53 and 54, and trap door 58 in the opposite direction such that the trap door closes in contact with the underside of the box 49. The solenoid 36 is then in its starting position so it can actuate the three-way valve 37 to admit air under pressure to the cylinder 38 in response to a flow of current from the adjustable timer 21. As the switch 32 moves from contact 34 to contact 33, the holding action of brake means 6 is interrupted and the clutch means 7 once again serves to transmit the rotational motion from the motor 4 to the variable speed pulley 13 causing buckets 16 to move, assuming that none of the operators have broken the control means circuit by pushing on the buttons 28, 29, or 31 and that the safety switches 69, 71, and 72 have returned to their closed position. Movement of the conveyor will continue until the rod 17 of the next succeeding bucket 16 contacts arm 18 to close switch 19 to initiate the cycle again.

At the same time switch 19 is closed to energize clutch means 7 by the transmission of current through timer 21 and relay 22, current is passed to the counter 74 to record the stop of the conveyor and to the signal device 76 for the purpose of establishing a signal which can be used to activate a packaging machine mounted in cooperation with the chute 73. This will allow the packaging machine to initiate its operation and package the articles dumped from the bucket 16 as it passes around the end of sprocket 9.

The timer means 21 of the control means is designed so that it cannot transmit current again after the predetermined time has elapsed until switch 19 has been opened by the conveyor moving to bring rod 17 out of contact with arm 18. This feature will prevent the switch 19 and hence the brake means 6 from remaining in operation continuously because when the time given the adjustable timer 21 has elapsed, the timer 21 cannot transmit current to relay 22 until switch 19 has been opened and closed.

The variable speed pulley 13 allows the conveyor speed to be adjusted relative to the substantially constant speed of the motor 4. This adjustment coupled with the adjustable timer 21 results in an apparatus which is extremely flexible in its operation insofar as speed is concerned, thus making it readily adaptable for a variety of different operations.

Although the invention has been described in considerable detail, such detail has been resorted to for the purpose of illustration only. Many variations and modifications of the invention can be made without departing from the spirit and scope thereof.

I claim:
1. Apparatus for transmitting articles from a plurality of separate locations to a single location comprising, in combination, conveyor means including a plurality of buckets mounted for travel over a path adjacent said separate locations; separate hopper means located along the conveyor means and associated with each of said separate locations and said conveyor means for receiving articles from each of said locations; control means connected to said conveyor means and actuated by movement of said conveyor means for effecting intermittent movement of said conveyor means to successively stop the buckets in a position to receive articles from said hopper means; and means connected to said hopper means for allowing articles to be transferred from said hopper means to the buckets of said conveyor means at times only when the buckets are stopped.

2. Apparatus according to claim 1 wherein said control means includes a timer means for controlling the time the buckets remain stopped.

3. Apparatus according to claim 1 wherein said control means includes a first switch means adapted to close a circuit to transmit an electric current to a relay means; second switch means connected to said relay means and adapted to transmit electric current to a brake means to stop said conveyor means in response to electric current flow through said relay means; and clutch means connected to said second switch means for starting said conveyor means when the electric current flow to said relay means terminates.

4. Apparatus according to claim 1 wherein said means for allowing articles to be transferred from said hopper means to the buckets of said conveyor means includes solenoid means connected to said control means; a trap door mounted for movement between an open and closed position on said hopper means; and means connected to said solenoid means and said trap door to effect movement of said trap door in response to said control means.

5. Apparatus according to claim 4 wherein said trap door is self-hinged to said hopper.

6. Apparatus according to claim 1 wherein said hopper means includes a trap door mounted to be opened and closed responsive to said control means.

7. Apparatus according to claim 1 wherein said control means includes a counter means for recording the number of stops said conveyor means makes for a given time interval.

8. Apparatus according to claim 1 wherein said control means includes signal means for establishing a signal in response to each stop of said conveyor means.

References Cited
UNITED STATES PATENTS

| | | | |
|---|---|---|---|
| 13,397 | 8/1855 | Postley | 198—39 X |
| 877,900 | 2/1908 | Brown | 198—19 X |
| 1,192,561 | 7/1916 | Reiser | 198—19 X |
| 1,753,548 | 4/1930 | Butler | 141—160 X |
| 1,925,990 | 9/1933 | Pampel | 198—56 |
| 2,031,369 | 2/1936 | Holbeck | 198—56 X |
| 2,632,681 | 3/1953 | Newcomer | 198—135 X |
| 2,653,743 | 9/1953 | Stenger | 53—250 |
| 2,687,157 | 8/1954 | Cowan. | |
| 2,765,817 | 10/1956 | Grzenkowski et al. | 141—160 |
| 2,850,051 | 9/1958 | Rasmusson | 141—160 |
| 2,943,726 | 7/1960 | Granath | 198—135 |
| 3,056,485 | 10/1962 | Liberty | 198—135 |
| 3,081,861 | 3/1963 | Plach et al. | 198—40 |
| 3,128,800 | 4/1964 | Faerber | 198—135 X |

EVON C. BLUNK, *Primary Examiner.*

M. L. AJEMAN, *Assistant Examiner.*